US010271472B1

(12) United States Patent
Potter

(10) Patent No.: US 10,271,472 B1
(45) Date of Patent: Apr. 30, 2019

(54) AGRICULTURAL EQUIPMENT TRANSPORTATION METHOD AND APPARATUS

(71) Applicant: Donald Potter, Amazonia, MO (US)

(72) Inventor: Donald Potter, Amazonia, MO (US)

(*) Notice: Subject to any disclaimer, the term of this patent is extended or adjusted under 35 U.S.C. 154(b) by 0 days.

(21) Appl. No.: 15/728,278

(22) Filed: Oct. 9, 2017

(51) Int. Cl.
*A01B 73/00* (2006.01)
*B62D 53/06* (2006.01)
*B60P 1/43* (2006.01)
*B62D 53/08* (2006.01)

(52) U.S. Cl.
CPC ............... *A01B 73/00* (2013.01); *B60P 1/43* (2013.01); *B62D 53/061* (2013.01); *B62D 53/08* (2013.01)

(58) Field of Classification Search
CPC .. A01B 73/00; B60P 1/43; B60P 3/062; B60P 3/066; B60P 3/064; B60P 3/07; B60P 3/077; B60P 3/06; B60P 3/12; B62D 53/08; B62D 53/04; B62D 53/062
USPC ....... 414/334, 373, 481, 537, 529, 536, 790; 280/452.2, 402, 418.1, 425.1, 790
See application file for complete search history.

(56) References Cited

U.S. PATENT DOCUMENTS

| | | | | | |
|---|---|---|---|---|---|
| 2,389,211 | A | * | 11/1945 | Pointer | B62D 53/065 280/441.2 |
| 2,443,611 | A | * | 6/1948 | Ferguson | B60P 3/062 414/537 |
| 2,530,866 | A | * | 11/1950 | Evans | B60P 3/062 14/71.1 |
| 2,722,433 | A | * | 11/1955 | Shinn | B62D 53/061 280/417.1 |
| 2,854,162 | A | * | 9/1958 | Keir | B60P 3/062 280/425.2 |
| 2,952,476 | A | * | 9/1960 | Brockman | B62D 53/065 280/425.2 |
| 2,969,989 | A | | 1/1961 | Struthers | |
| 3,064,842 | A | * | 11/1962 | Haynie | B60P 1/6454 414/482 |
| 3,214,047 | A | | 10/1965 | Moye | |
| 3,532,362 | A | * | 10/1970 | Morgan | B62D 53/062 280/441.2 |
| 3,536,340 | A | * | 10/1970 | Talbert | B62D 49/005 280/441.2 |
| 3,584,754 | A | * | 6/1971 | Moll | B60P 1/28 280/423.1 |
| 3,779,411 | A | * | 12/1973 | Moretti, Jr. | B60P 3/062 410/3 |
| 3,866,773 | A | * | 2/1975 | Koch | B60P 3/062 172/811 |

(Continued)

*Primary Examiner* — Kaitlin S Joerger
(74) *Attorney, Agent, or Firm* — Hovey Williams LLP

(57) ABSTRACT

A trailer for transporting agricultural equipment over the road. The trailer includes a frame that supports a wheel travel path that is traversed by the tires of agricultural equipment hauled by the trailer roll as the equipment is loaded on and unloaded off the trailer. The wheel travel path includes a) an inclined rear section located at or near the back of the trailer, b) an over-wheel section located generally in front of the inclined rear section and positioned generally over one or more trailer wheels, c) a dropped landing section located generally in front of the over-wheel section, and d) an elevated landing section located generally in front of the dropped landing section. The over-wheel section is elevated relative to the dropped landing section and the elevated landing section is elevated relative to said over-wheel section.

22 Claims, 9 Drawing Sheets

(56) References Cited

U.S. PATENT DOCUMENTS

| | | | | |
|---|---|---|---|---|
| 3,894,747 | A * | 7/1975 | Wisdom | B62D 53/062 254/420 |
| 3,909,053 | A * | 9/1975 | Koch | B60P 3/062 280/770 |
| 3,910,436 | A | 10/1975 | Machan | |
| 3,927,775 | A * | 12/1975 | Graupmann | B60P 1/433 14/71.7 |
| 4,109,811 | A | 8/1978 | Stucky | |
| 4,296,941 | A * | 10/1981 | Van Wassenhove | B62D 53/065 280/441.2 |
| 4,483,549 | A * | 11/1984 | Nikawa | B60P 3/125 280/402 |
| 5,114,169 | A * | 5/1992 | Botkin | B62D 53/061 280/400 |
| 5,215,425 | A * | 6/1993 | Hambright | B60P 3/066 280/402 |
| 5,975,829 | A * | 11/1999 | Walters | A01B 73/005 14/71.1 |
| 6,425,627 | B1 * | 7/2002 | Gee | B62D 53/062 280/789 |
| 7,658,587 | B1 * | 2/2010 | Dierks | B60P 1/43 280/790 |
| 8,292,557 | B2 * | 10/2012 | Landoll | B60P 3/07 410/26 |
| 8,348,589 | B2 * | 1/2013 | Watkins | B60P 3/07 280/402 |
| 8,919,800 | B1 * | 12/2014 | Van Der Brink | A01D 75/008 280/400 |
| 9,290,215 | B2 * | 3/2016 | Smith | B60D 1/14 |
| 9,656,588 | B2 * | 5/2017 | Robertson | B60P 3/06 |
| 9,776,549 | B2 * | 10/2017 | Hagenbuch | B60P 3/125 |
| 2004/0052625 | A1 * | 3/2004 | Butterfield | B60P 1/435 414/537 |
| 2004/0223836 | A1 * | 11/2004 | Robertson | B60P 1/43 414/537 |
| 2013/0323006 | A1 * | 12/2013 | Smithson | B60P 3/062 414/812 |
| 2014/0321955 | A1 * | 10/2014 | Boguslawski | B65G 69/30 414/537 |
| 2016/0207436 | A1 * | 7/2016 | Thomas | B60P 3/077 |

* cited by examiner

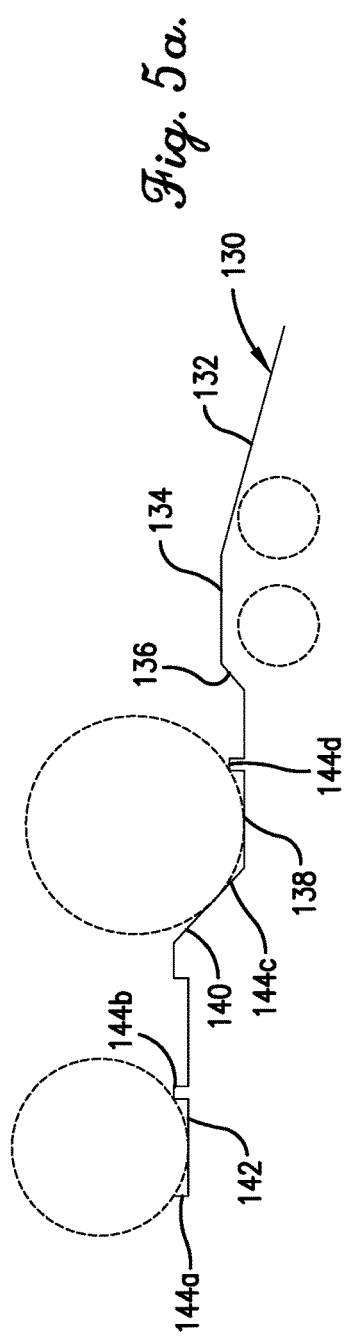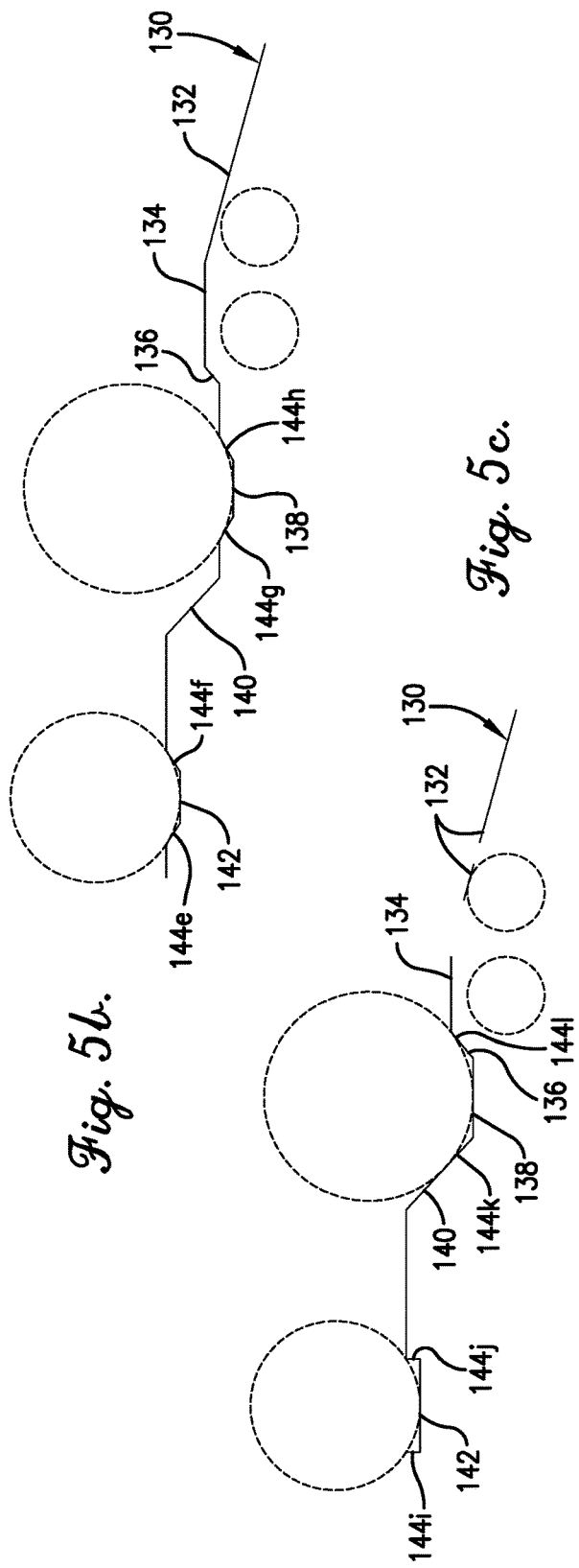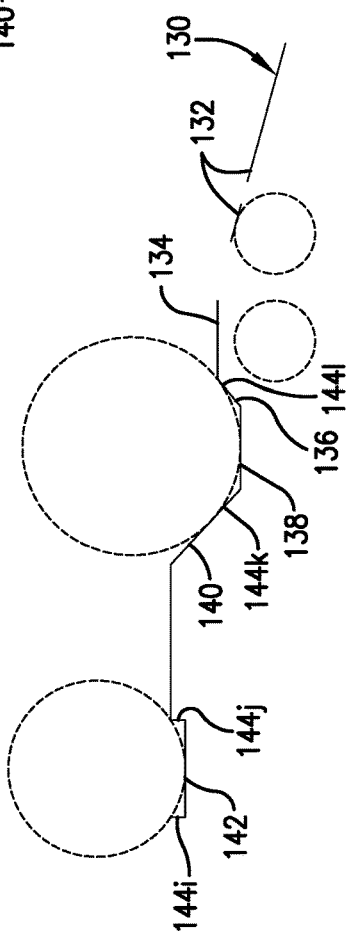

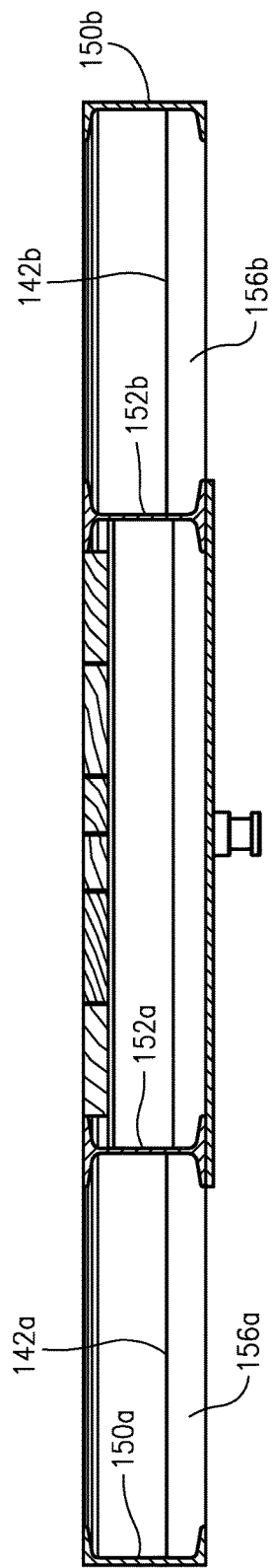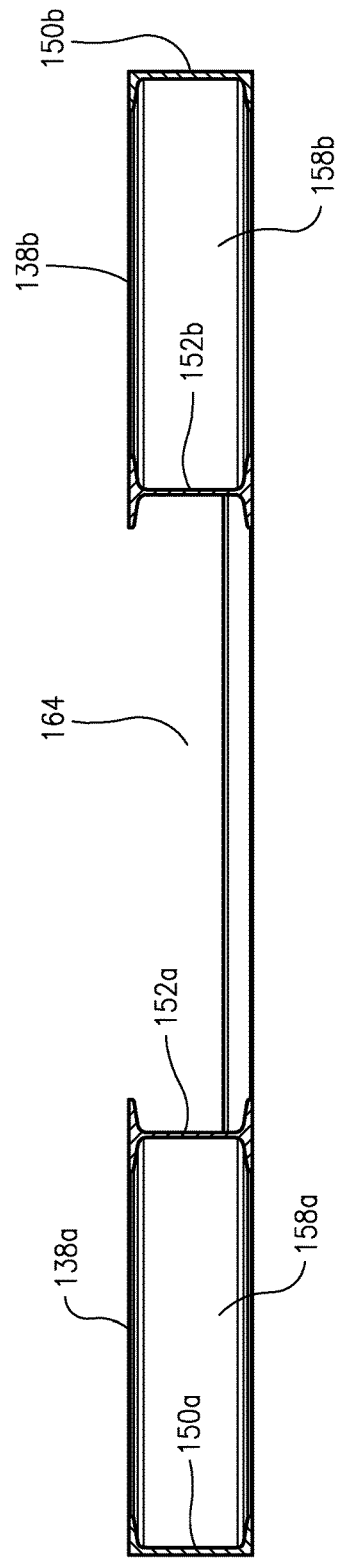

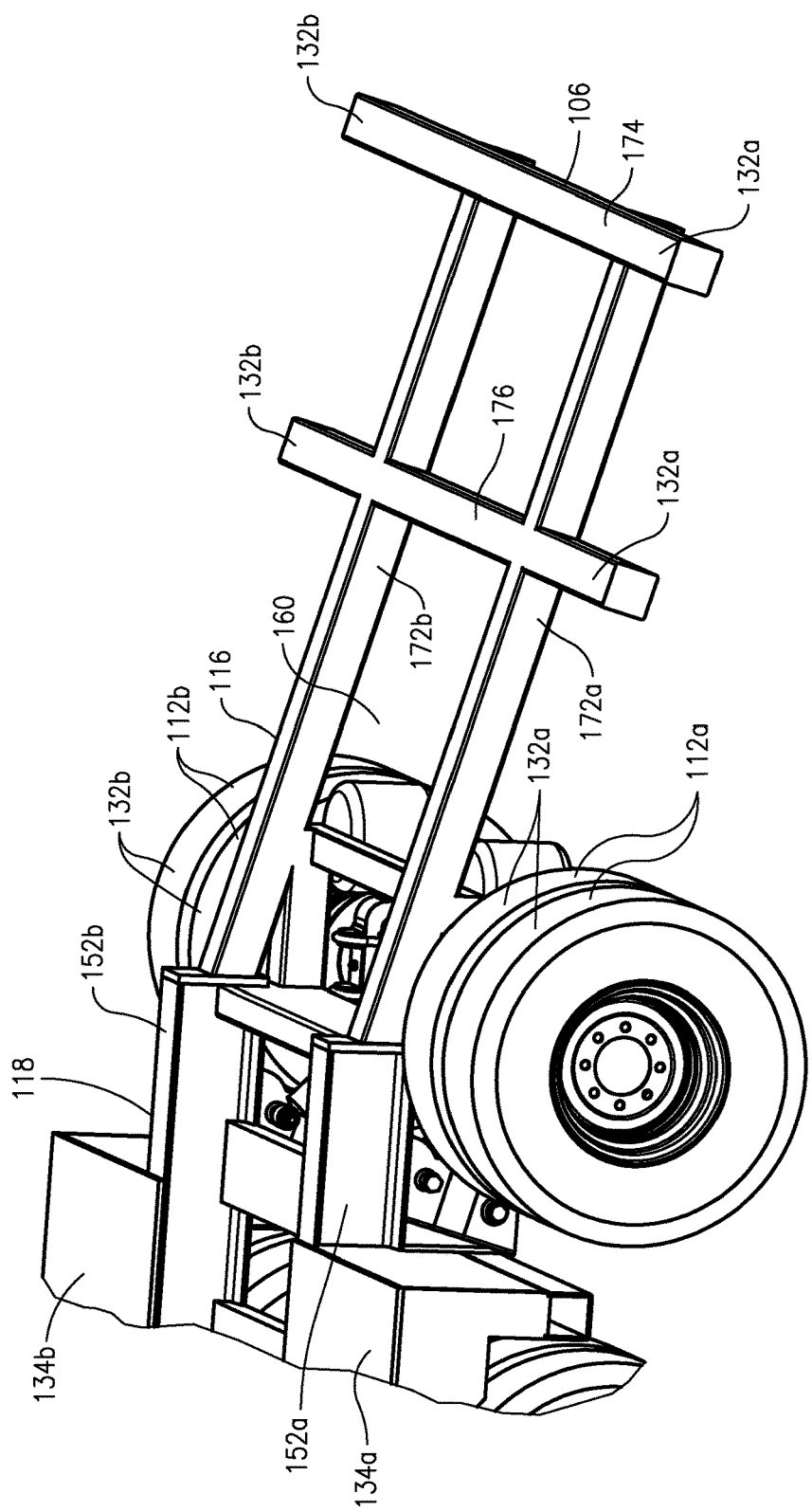

AGRICULTURAL EQUIPMENT TRANSPORTATION METHOD AND APPARATUS

BACKGROUND

This invention relates generally to the field of trailers. More particularly the invention concerns a trailer for transporting agricultural equipment, such as an agricultural tractor and/or an agricultural implement.

Some farmers work fields that are widely spaced apart. As such, the farmers must transport agricultural equipment, such as an agricultural tractor and associated implements for tillage, cultivation, and/or other agricultural operations, to such widely spaced fields. Some farmers transport the tractor and implement to remote fields by pulling the implement with the tractor and operating the tractor on public roads. However, typical agricultural tractors are slow and heavy. As such, agricultural tractors may obstruct the flow of traffic and pose a danger to unwitting drivers coming around a turn or topping a hill. In addition, driving the tractor to remote fields adds to the total operating time of the tractor, which may decrease its resale value.

Some farmers transport the tractor and implement separately between the fields with a conventional over-the-road heavy-duty truck and trailer system. However, implements and tractors have been developed to increase efficiency and lower operating costs, often resulting in larger and heavier equipment that is difficult to transport using a conventional over-the-road vehicle and trailer. Often, separate trailers must be used for the tractor and the implement. In addition, it is time consuming to detach the implement from the tractor and to load and unload each piece of equipment from its respective trailer. As such, each of the transportation solutions described above have substantial disadvantages.

SUMMARY OF THE INVENTION

In one aspect, the present invention concerns an over-the-road agricultural equipment transportation system comprising: (a) an over-the-road towing vehicle supported on a ground surface; (b) a trailer coupled behind the towing vehicle and cooperatively supported on the towing vehicle and on the ground surface; (c) an agricultural tractor loaded on and supported by the trailer; and (d) an agricultural implement coupled to the tractor, extending behind the trailer, and cooperatively supported on the tractor and on the ground surface.

In another aspect, the invention concerns a method of transporting an agricultural vehicle. The method includes the steps of (a) providing an over-the-road towing vehicle with a trailer coupled behind the towing vehicle; (b) providing an agricultural tractor with an agricultural implement coupled behind the tractor; (c) loading the agricultural tractor onto the trailer by driving the tractor onto the trailer while the implement is coupled to the tractor and the trailer is coupled to the towing vehicle; and (d) towing the trailer, the tractor, and the implement over a road with the towing vehicle while the tractor is loaded on the trailer, the implement is attached to the tractor, and the implement is pulled behind the tractor on the road.

In yet another aspect, the invention concerns a trailer for enabling simultaneous over-the-road transportation of an agricultural tractor and an agricultural implement that is connected to the agricultural tractor. The trailer can include: (a) an elongated frame having a front end and a back end; (b) a vehicle connection hitch coupled to the frame near the front end and configured to connect the trailer to an over-the-road towing vehicle; (c) a plurality of trailer wheels coupled to the frame near the back end and configured to support the trailer on a ground surface; and (d) a wheel travel path at least partially supported by the frame and extending from the back end toward the front end of the frame. The wheel travel path is configured to engage the tires of the tractor as the tractor is loaded on and unloaded off the trailer. The wheel travel path includes i) an inclined rear section located at or near the back end of the frame, ii) an over-wheel section located generally in front of the inclined rear section and positioned generally over at least a portion of the trailer wheels, iii) a dropped landing section located generally in front of the over-wheel section, and iv) an elevated landing section located generally in front of the dropped landing section. The over-wheel section is elevated relative to the dropped landing section and the elevated landing section is elevated relative to the over-wheel section.

DRAWINGS

The invention will become better understood when the following detailed description is read with reference to the accompanying drawings in which the characters represent like or similar parts throughout the drawings, wherein.

Figure 1:
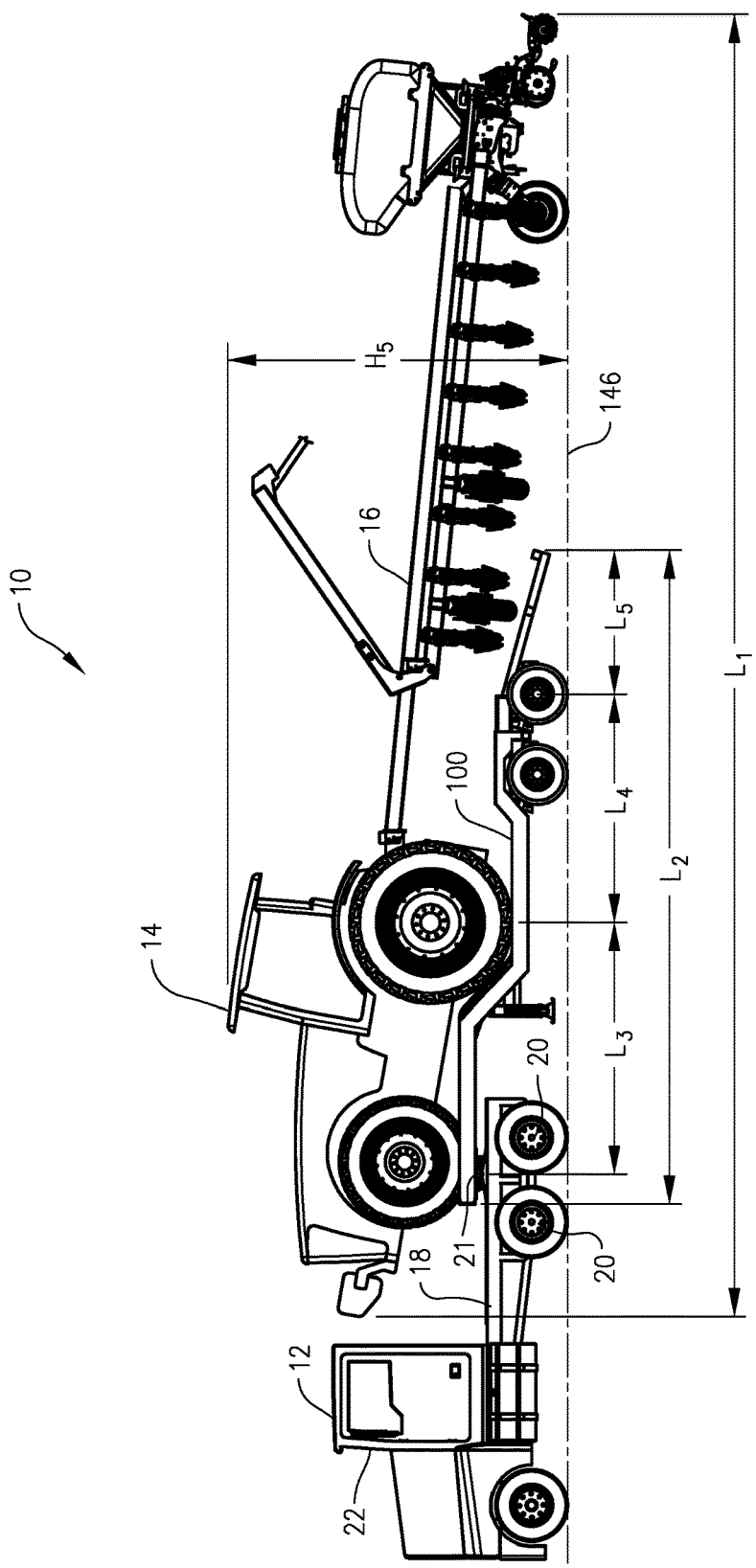
FIG. 1 is a side view of an agricultural equipment transporting system in a loaded transporting configuration.
Figure 4:
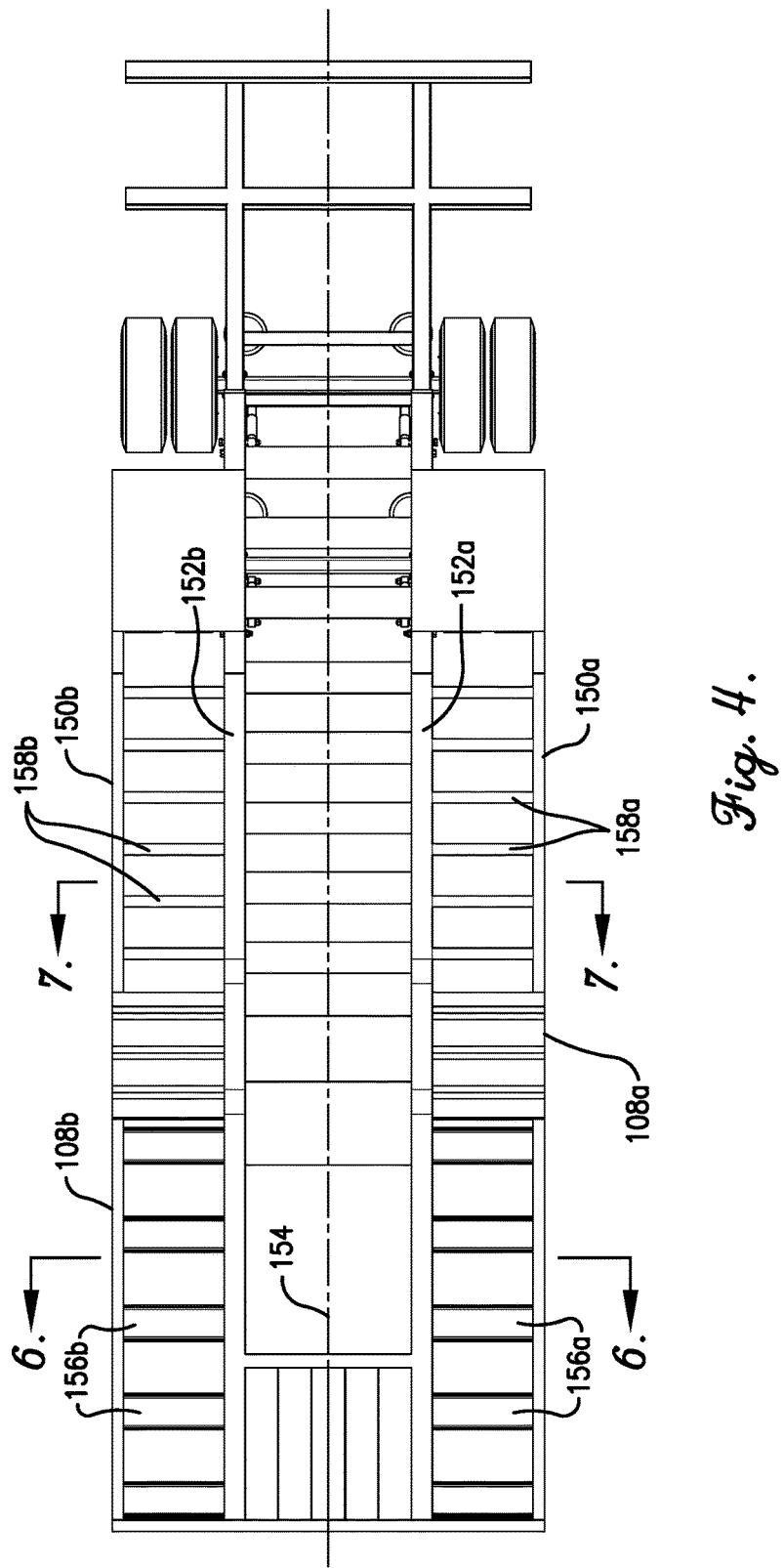
FIG. 4 is a top view of the trailer of FIG. 1.
Figure 9:
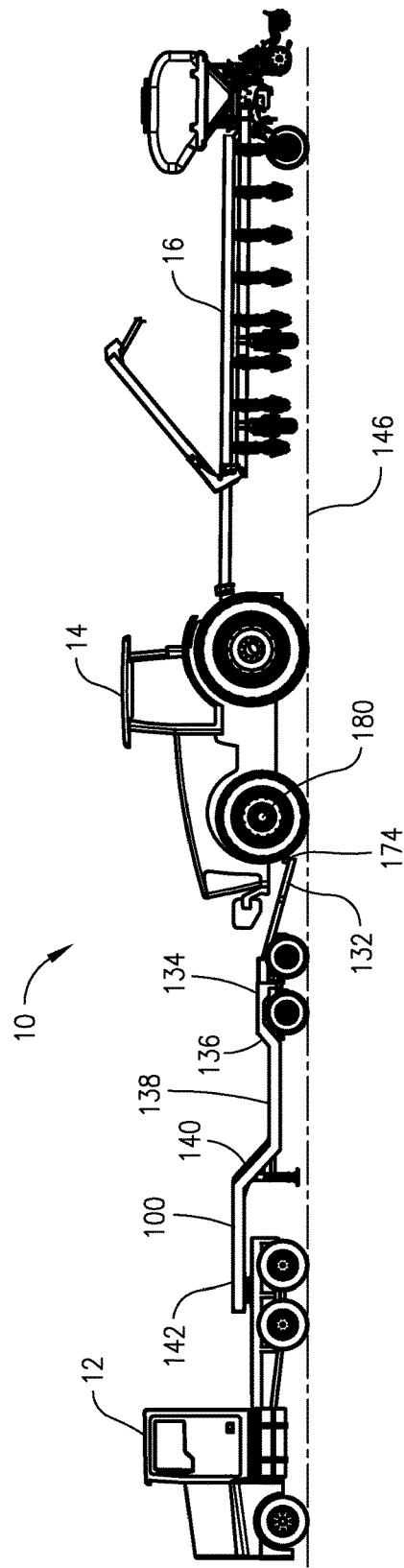
Figure 10:
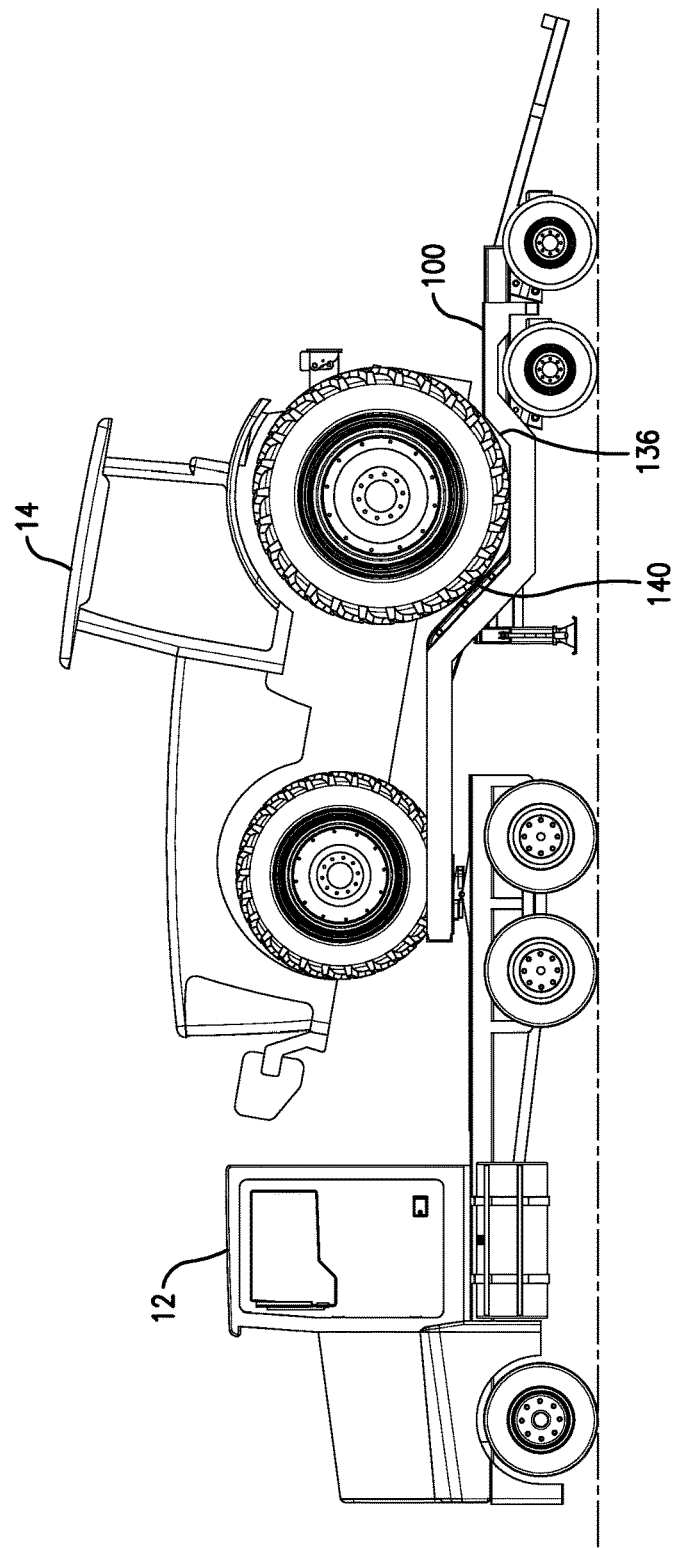

FIGS. 5a-c are schematic side views depicting various configurations of wheel travel paths for trailers constructed according to various embodiments of the present invention;

FIG. 6 is a section view of elevated support portion of the trailer of FIG. 1, taken along line 6-6 of FIG. 4;

FIG. 7 is a section view of a dropped support portion of the trailer of FIG. 1, taken along line 7-7 of FIG. 4;

FIG. 8 is an enlarged view of a rear ramp portion of the trailer of FIG. 1;

FIG. 9 is a side view of the agricultural equipment transporting system shown in FIG. 1 in an unloaded configuration; and FIG. 10 is a side view of a towing vehicle pulling a trailer hauling a tractor, without an implement attached to the tractor.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. The drawings are not necessarily to scale, emphasis instead being placed upon clearly illustrating the principles of the embodiments of this disclosure.

DETAILED DESCRIPTION

FIG. 1 is a side view of an agricultural equipment transporting system 10 in a loaded transporting configuration. In the illustrated embodiment, the system 10 includes a trailer 100 coupled to a towing vehicle 12. The trailer 100 is configured for transporting agricultural equipment, such as a farm tractor 14 to which an agricultural implement 16 is coupled.

Figure 2:
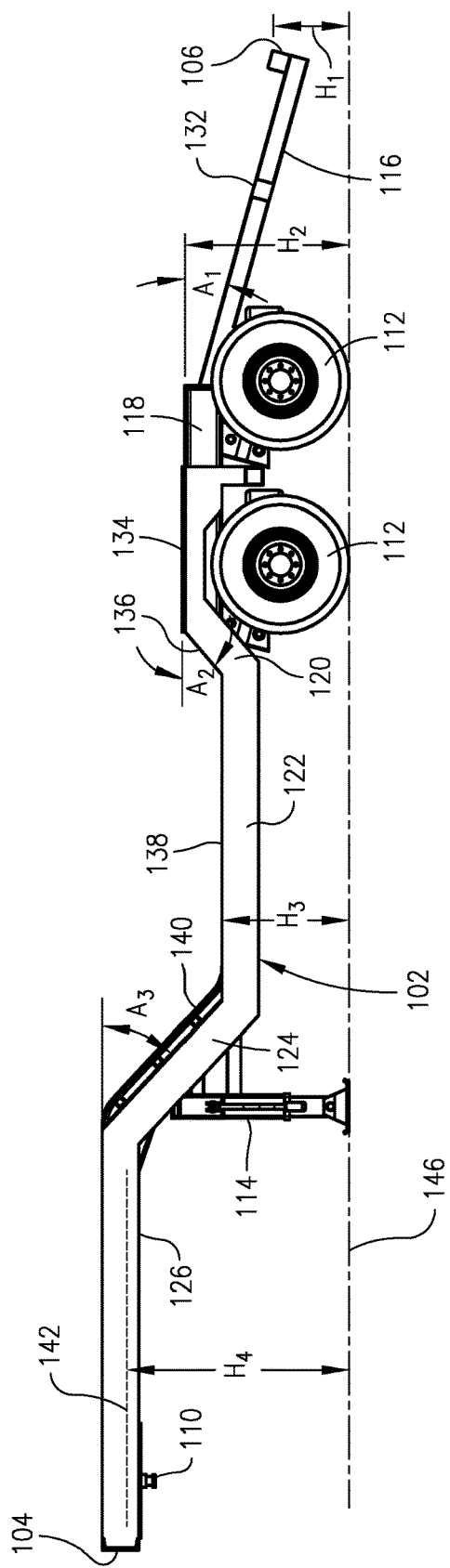
FIG. 2 is a side view of the trailer of FIG. 1.

The towing vehicle 12 may be a conventional over-the-road heavy-duty truck. The towing vehicle 12 includes a frame 18, axle assemblies 20, and a cab 22. The frame 18 has a coupling 21 (e.g., a fifth-wheel coupling) positioned rearwardly of the cab 22 and generally between the axle assemblies 20, so that the trailer 100 can horizontally articulate (pivot) relative to the vehicle 12 about a vertical axis at the coupling 21. The coupling 21 can have an opening (not shown) for receiving a vehicle connection hitch member 110 (e.g., a king pin), as shown in FIG. 2. The connection hitch member 110 is locked to the coupling 21 of the towing vehicle 12 by a locking mechanism (not shown) when the trailer 100 is coupled to the towing vehicle 12.

As depicted in the loaded configuration of FIG. 1, the weight of the towing vehicle 12 is entirely supported on the ground surface 146; the weight of the trailer 100 is cooperatively and simultaneously supported on the towing vehicle 12 (at front of the trailer 100) and on the ground surface 146 (near the rear of the trailer 100); the weight of the tractor 14 is entirely supported on the trailer 100; and the weight of the implement 116 is cooperatively and simultaneously supported on the tractor 14 (at front of the implement 16) and on the ground surface 146 (near the rear of the implement 16).

The implement 16 is illustrated in FIG. 1 as a front-folding planter connected to the tractor 14 by a two-point hitch. However, implement 16 can be any agricultural implement (e.g., drill, cultivator, harrow, sprayer, harvester, swather, rake, etc.) that is pulled by a tractor and includes wheels capable of supporting the implement on a road while being pulled at speeds in excess of the top speed of the tractor (e.g., in excess of 30, 40, or 50 miles per hours).

Figure 3:
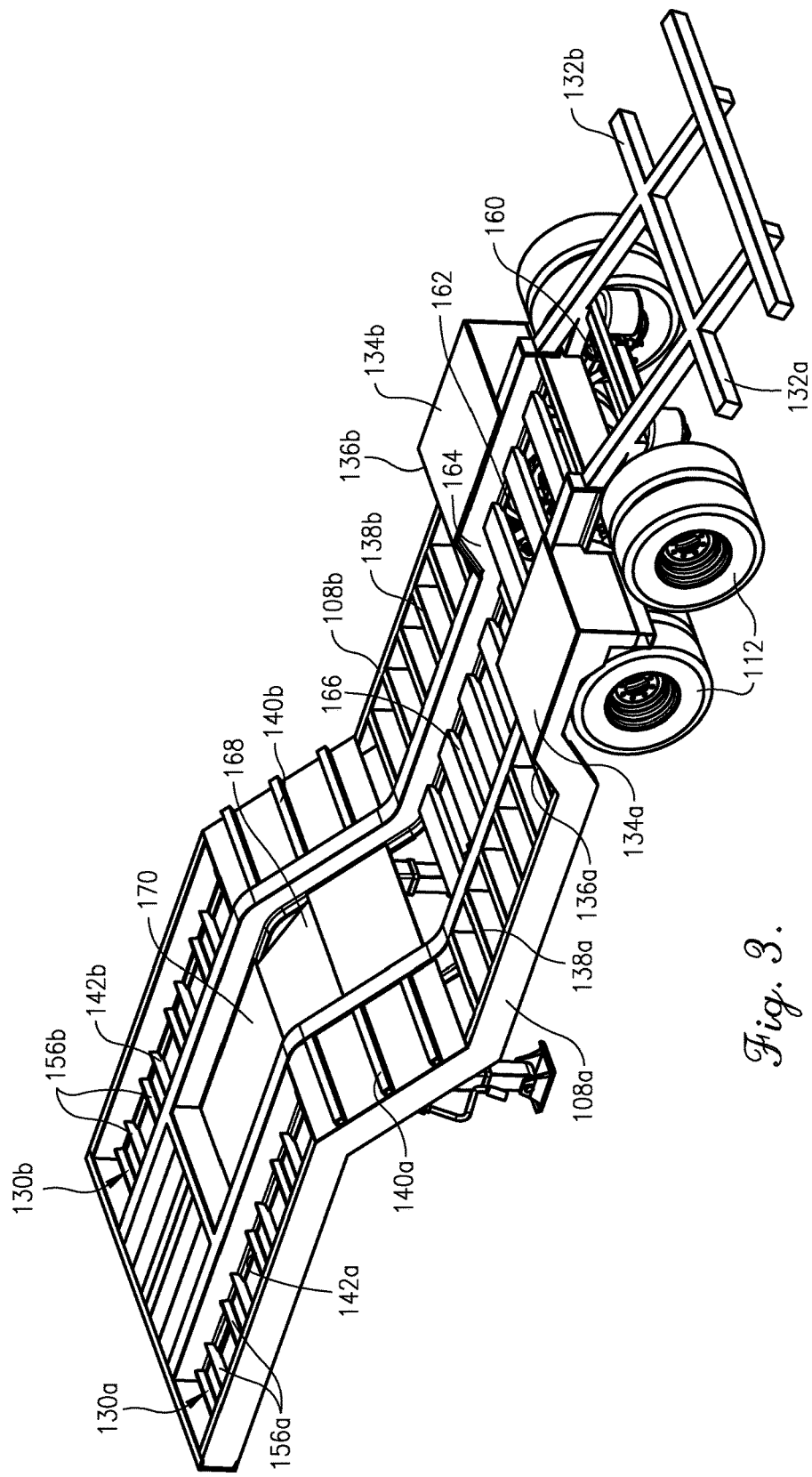
FIG. 3 is a perspective view of the trailer of FIG. 1.

As depicted in FIGS. 2-4, the trailer 100 includes an elongated, longitudinal frame 102 having a front end 104, an opposite rear end 106, and a pair of spaced longitudinally-extending sides 108a,b. A vehicle connection hitch 110 (e.g., a king pin) is coupled to the frame 102 near the front end 104. The vehicle connection hitch 110 is configured to selectively couple the trailer 100 to the towing vehicle 12, as shown in FIG. 1.

The trailer 100 also includes one or more trailer wheels 112 positioned at or near the rear end 106 of the frame 102. In the exemplary embodiment, the wheels 112 are tandem wheel/axle assemblies. The trailer 100 may include landing gear 114 coupled to the frame 102 just behind the connection hitch 110.

The frame 102 of the trailer 100 includes various frame segments that are configured to support the weight of the tractor 14 as the tractor 14 is loaded on the trailer 100, transported on the trailer 100, and unloaded off the trailer 100. As shown in FIG. 2, the frame 102 generally includes a rear ramp segment 116, a wheel connection segment 118, a rear transition segment 120, a middle support segment 122, a front transition segment 124, and a front support segment 126. In certain embodiments, the frame 102 is sufficiently robust to provide the trailer 102 with a loaded capacity of at least 5,000, 10,000, or 15,000 pounds.

In many conventional trailers used to haul heavy equipment (e.g., lowboy trailers), one or more of the frame segments between the front end and rear end of the trailer are detachable from one another and/or are movable relative to one another to facilitate loading and unloading. In one embodiment of the present invention, each of the frame segments 116-126 is a rigid member or a rigid assembly of members and all of the frame segments 116-126 are rigidly and permanently coupled to one another. In such a configuration, the positions and orientations of all the frame segments 116-126 are permanently fixed relative to one another. As used herein, the term "rigid" denotes a member or assembly of members that does not include a mechanism for permitting non-destructive rotation (e.g., a hinge) or a translation (e.g., telescoping connection) of the member/assembly. As used herein, the term "rigidly coupled" denotes a connection between two members that prevents rotation or translation of the two members relative to one another. As used herein, the term "permanently coupled" denotes a connection between two members that is not readily decoupled in a non-destructive manner. For example, members that are connected to one another by welding or by multiple bolts and nuts are considered permanently coupled. As used herein, "releasably coupled" denotes a connection between two members that permits the two members to be readily decoupled from one another in a non-destructive manner. For example, conventional tow hitches allow a towing vehicle and a trailer to be releasably coupled to one another.

The frame 102 of the trailer 100 supports a wheel travel path 130 that is engaged by the tires of the tractor 14 as the tractor 14 is loaded on the trailer 100, transported on the trailer 100, and unloaded off the trailer 100. In certain embodiments, the wheel travel path 130 includes laterally spaced, parallel left and right paths 130a,b for engaging and supporting the left and right tires of the tractor 14, respectively.

The wheel travel path 130 is supported by the frame 102. In certain embodiments, at least a portion of the of the wheel travel 130 can be defined by a surface of the frame 102. As perhaps best illustrated in FIG. 2, the wheel travel path 130 can include an inclined rear section 132, an over-wheel section 134, a declined transition section 136, a dropped landing section 138, an inclined transition section 140, and an elevated landing section 142.

In general, the inclined rear section 132 of the wheel travel path 130 is supported by the rear ramp segment 116 of the frame 102; the over-wheel section 134 of the wheel travel path 130 is supported by the wheel connection segment 118 of the frame 102; the declined transition section 136 of the wheel travel path 130 is supported by the rear transition segment 120 of the frame 102; the dropped landing section 138 of the wheel travel path 130 is supported by the middle support segment 122 of the frame 102; the inclined transition section 140 of the wheel travel path 130 is supported by the front transition segment 124 of the frame 102; and the elevated landing section 142 of the wheel travel path 130 is supported by the front support segment 126 of the frame 102.

In certain embodiments, at least one section of the wheel travel path 130 can be recessed relative to the upper surface of the segment of the frame 102 supporting that section of the travel path 130. For example, FIG. 2 shows the elevated landing section 142 of the travel path 130 being recessed relative to the top surface of the front support segment 126 of the frame 102. Additionally, in certain embodiments, at least one section of the wheel travel path 130 can be elevated relative to the upper surface of the segment of the frame 102 supporting that section of the travel path 130. For example, the over-wheel section 134 of the wheel travel path 130 can be defined by the top surface of a plate and/or board that is supported on the top surface of the wheel connection segment 118 of the frame 102. In such a configuration, the over-wheel section 134 of the wheel travel path 130 can be elevated relative to the upper surface of the wheel connection section 118 of the frame 102 by the thickness of the boards or plates.

The trailer 100 can include one of more wheel stops that engage one or more tires of the tractor 14 when the tractor 14 is in the loaded position on the trailer 100. The wheel stops can be forward stops that restrict forward movement of the tractor 14 relative to the trailer 100 and/or rear stops that restrict rearward movement of the tractor 14 relative to the trailer 100. In certain embodiments, the wheel stops secure the tractor 14 to the trailer 100 in a manner sufficient to eliminate the need for additional securement devices (e.g., tie downs) to secure the tractor 14 to the trailer 100, even when pulling the implement 16 attached to the loaded tractor 14 over the road.

In the embodiment depicted in FIGS. 1-4, the inclined transition section 140 of the wheel travel path 130 can act as a wheel stop contacting a front portion of the rear tractor tires, while a structural cross member forming the front end 104 of the trailer 100 can act as a wheel stop contacting a front portion of the front tractor tires.

FIGS. 5a-c depict alternatively configured wheel travel paths 130 that can be employed on the trailer 100. More specifically, each of the wheel travel paths of FIGS. 5a-c uses differently configured wheel stops 144a-l.

FIG. 5a shows that wheel stops 144a,b contact the front and back sides of the front tractor tire (shown with dashed lines) to form a front tire saddle within which the front tractor tire sits while supported on the elevated landing section 142. FIG. 5a also shows that wheel stops 144c,d contact the front and back sides of the rear tractor tire (shown with dashed lines) to form a rear tire saddle within which the rear tractor tire sits while supported on the dropped landing section 138. In FIG. 5a, wheel stop 144c is defined by the inclined transition section 140.

FIG. 5b shows that wheel stops 144e,f contact the front and back sides of the front tractor tire to form a front tire saddle within which the front tractor tire sits while supported on the elevated landing section 142. FIG. 5b also shows that wheel stops 144g,h contact the front and back sides of the rear tractor tire to form a rear tire saddle within which the rear tractor tire sits while supported on the dropped landing section 138.

FIG. 5c shows that wheel stops 144i,j contact the front and back sides of the front tractor tire to form a front tire saddle within which the front tractor tire sits while supported on the elevated landing section 142. FIG. 5c also shows that wheel stops 144k,l contact the front and back sides of the rear tractor tire to form a rear tire saddle within which the rear tractor tire sits while supported on the dropped landing section 138. In FIG. 5c, wheel stop 144k is defined by the inclined transition section 140 and wheel stop 144l is defined by the declined transition section 136. In addition, FIG. 5c shows an embodiment where a portion of the wheel travel path is defined by an outer surface of at least one of the trailer tires (shown with dashed lines). More specifically, FIG. 5c depicts the rear trailer tire as presenting a portion of the inclined rear section 132 of the travel path. In such a configuration, the top of the rear trailer tire is exposed so that as the tractor is loaded onto or unloaded off of the trailer, the tires of the tractor contact the top surface of the trailer tire in a manner such that at least a portion of the weight of the tractor is supported on the trailer tire. The trailer 100 depicted in FIGS. 1-5 has this type of exposed rear trailer tire configuration.

Referring again to FIGS. 1-4, the inventor has configured the dimensions and orientations of the various segments 116-126 of the frame 102 and the various sections 132-142 of the wheel travel path 130 to achieve one or more of the following benefits: (1) the tractor 14 can be loaded on and unloaded off the trailer 100 without having to disconnect the trailer 100 from the towing vehicle 12; (2) the tractor 14 can be loaded on and unloaded off the trailer 100 without having to move ramps into place; (3) a large tractor 14 can be hauled on the trailer 100 over the road without exceeding height regulations; (4) the tractor 14 and implement 16 can be simultaneously towed over the road using one tow vehicle 12 and without exceeding length regulations; and/or (5) the tractor 14 can be loaded on the trailer 100 and pulled over the road (optionally, also pulling the implement 16 over the road behind the tractor 14) without having to secure the tractor 14 to the trailer 100 with additional securement mechanisms.

FIGS. 1 and 2 depict various dimensions and angles of the agricultural equipment transportation system 10 and the trailer 100. In FIG. 1, $L_1$ is the overall length from the front of the tractor 14 to the back of the implement 16 or from the front of the trailer to the back of the implement 16, whichever is longer; $L_2$ is the overall length of the trailer 100, measured from the front end 104 to the rear end 106; $L_3$ is the length between the elevated landing 142 for the front tires of the tractor and the dropped landing 138 for the rear tires of the tractor 14; $L_4$ is the length between the dropped landing 138 for the rear tires of the tractor 14 and the rear axle of the trailer 100; and $L_5$ is the length between the rear axle of the trailer 100 and the rear end 106. Lengths $L_1$-$L_5$ are measured as the horizontal distance between the points when the trailer is horizontally-oriented on a level ground surface 146.

The angles $A_1$-$A_3$ depicted in FIG. 2 are measured relative to horizontal. $A_1$ is the angle of the inclined rear section 132; $A_2$ is the angle of the declined rear transition section 136; and $A_3$ is the angle of the inclined front transition section 140.

The heights $H_1$-$H_5$ depicted in FIGS. 1 and 2 are measured relative to the horizontal ground surface 146 with the trailer 100 being level relative to the ground surface 146. $H_1$ is the height at the rear end 106 of the inclined rear section 132; $H_2$ is the height of the over-wheel section 134; $H_3$ is the height of the dropped landing section 138; $H_4$ is the height of the elevated landing section 142; and $H_5$ is the height of the tallest portion of the tractor 14 loaded on the trailer 100.

The below table, provides broad, intermediate, and approximate values for the dimensions and angles labeled in FIGS. 1 and 2.

TABLE

| Dimension | Units | Broad Range | Narrow Range | Approx. Value |
|---|---|---|---|---|
| $H_1$ | feet | 0.5 to 1.5 | 0.75 to 1.25 | about 1 |
| $H_2$ | feet | 2 to 4 | 2.5 to 3.5 | about 3 |
| $H_3$ | feet | 1.5 to 3.5 | 2 to 3 | about 2.5 |
| $H_4$ | feet | 3.5 to 5.5 | 4 to 5 | about 4.5 |
| $H_5$ | feet | 12 to 18 | <15 | about 14 |
| $L_1$ | feet | 45 to 60 | 48 to 55 | about 52 |
| $L_2$ | feet | 15 to 30 | 22 to 28 | about 25 |
| $L_3$ | feet | 6 to 12 | 8 to 12 | about 10 |
| $L_4$ | feet | 4 to 12 | 5 to 8 | about 6 |
| $L_5$ | feet | 4 to 12 | 5 to 8 | about 6 |
| $A_1$ | degrees | 10 to 45 | 15 to 35 | about 25 |
| $A_2$ | degrees | 30 to 60 | 40 to 50 | About 45 |
| $A_3$ | degrees | 30 to 60 | 40 to 50 | about 45 |
| $H_2$-$H_1$ | feet | 1 to 3 | 1.5 to 2.5 | about 2 |
| $H_2$-$H_3$ | feet | 0.1 to 1.5 | 0.25 to 1 | about 0.5 |
| $H_4$-$H_2$ | feet | 0.5 to 4 | 1 to 2.5 | about 1.5 |
| $H_4$-$H_3$ | feet | 1 to 4 | 1.5 to 2.5 | about 2 |
| $H_5$-$H_3$ | feet | 10 to 16 | 11 to 14 | about 12.5 |
| $L_5$/$H_2$ | — | 1.5 to 2.5 | 1.75 to 2.25 | about 2 |
| $H_2$/$H_3$ | — | >1 to 2 | 1.1 to 1.5 | about 1.2 |

TABLE-continued

| Dimension | Units | Broad Range | Narrow Range | Approx. Value |
|---|---|---|---|---|
| $H_4/H_3$ | — | 1.25 to 4 | 1.5 to 2.5 | about 1.8 |
| $H_4/H_2$ | — | 1.1 to 3 | 1.25 to 2 | about 1.5 |

As perhaps best shown in FIGS. 3, 4, 6, and 7, the frame 102 can include elongated left and right outer support beams 150a,b and elongated left and right inner support beams 152a,b. The outer and inner support beams 150a,b and 152a,b are each oriented parallel to a longitudinal central axis 154 of the trailer 100. The outer support beams 150a,b are each spaced an equal distance from the central axis 154 and the inner support beams 152a,b are each spaced a smaller equal distance from the central axis 154. The left outer and inner beams 150a and 152a are spaced from one another by a distance equal to the spacing between the right outer and inner beams 150b and 152b.

The left outer and inner beams 150a and 152a can be used to support at least a portion of a left wheel travel path 130a that extends between and/or above the left outer and inner beams 150a and 152a. Similarly, the right outer and inner beams 150b and 152b can be used to support at least a portion of a right wheel travel path 130b that extends between and/or above the right outer and inner beams 150b and 152b.

Each of the outer and inner support beams 150a,b and 152a,b may be fabricated as single beam members or as multiple members rigidly coupled together (e.g., by welding). As shown in FIGS. 6 and 7, the outer support beams 150a,b can have a generally C-shaped cross-section, while the inner support beams 152a,b can be I-beams. However, it is contemplated that the outer and inner support beams 150a,b and 152a,b can be fabricated in any configuration that enables the frame 102 to function as described herein. For example, the outer and inner beams 150a,b and 152a,b could have any cross-sectional shape, such as, for example, rectangular (tubing), an I-shape (I-beam), and a C-shape (C-channel).

As shown in FIGS. 3, 4, and 6, a plurality of longitudinally-spaced, laterally extending left elevated cross members 156a extend between and are coupled to the left outer and inner support beams 150a and 152a. Similarly, a plurality of longitudinally-spaced, laterally extending right elevated cross members 156b extend between and are coupled to the right outer and inner support beams 150b and 152b. The upper surfaces of one or more of these left and right elevated cross members 156a,b can present the left and right elevated landing sections 142a,b of the left and right wheel travel paths 130a,b. The upper surfaces of the elevated cross members 156a,b can be recessed relative to the upper surfaces of the beams 150a,b and 152a,b. As such, the elevated landing sections 142a,b can be located in recessed areas that receives the front tires of the tractor when the tractor is in the loaded position.

As shown in FIGS. 3, 4, and 7, a plurality of longitudinally-spaced, laterally extending left dropped cross members 158a extend between and are coupled to the left outer and inner support beams 150a and 152a. Similarly, a plurality of longitudinally-spaced, laterally extending right dropped cross members 158b extend between and are coupled to the right outer and inner support beams 150b and 152b. The upper surfaces of one or more of these left and right dropped cross members 158a,b can present the left and right dropped landing sections 138a,b of the left and right wheel travel paths 130a,b. The upper surfaces of the dropped cross members 158a,b can be substantially flush with the adjacent upper surfaces of the beams 150a,b and 152a,b.

As shown in FIG. 3, in certain instances, it is necessary for the trailer to included recesses 160,162,164,166,168 between the left and right wheel travel paths 130a,b to ensure proper clearance for the front weights of the tractor and the rear hitch of the tractor as the tractor is loaded onto and unloaded off of the trailer 100. More specifically, a rear ramp recess 160 can be defined between and below (at a lower elevation than) the left and right inclined rear sections 132a,b of left and right wheel travel paths 130a,b; an over-axel recess 162 can be defined between and below (at a lower elevation than) the left and right over-wheel sections 134a,b of the left and right wheel travel paths 130a,b; a rear declined recess 164 can be defined between and below (at a lower elevation than) the left and right declined transition sections 136a, b of the left and right wheel travel paths 130a,b; a dropped recess 166 can be defined between and below (at a lower elevation than) the left and right dropped landing sections 138a,b of the left and right wheel travel paths 130a,b; a front inclined recess 168 can be defined between and below (at a lower elevation than) the left and right inclined transition sections 140a,b of the left and right wheel travel paths 130a,b; and an elevated front recess 170 can be defined between and below (at a lower elevation than) the left and right elevated landing sections 142a,b of the left and right wheel travel paths 130a,b. Generally, each recess 160-170 can provide at least 2, 4, or 6 inches of clearance below the left and right sections of the wheel travel paths 130a,b adjacent the recesses.

FIG. 8 is an enlarged view of the rear ramp segment 116 of the frame 102. The rear ramp segment 116 supports at least a portion of the left and right rear inclined sections 132a,b of the left and right wheel travel paths 130a,b. The rear ramp segment 116 extends rearwardly and downwardly from the wheel connection segment 118 of the frame 102 to the back end 106 of the frame 102. Unlike many conventional trailer ramps, the rear ramp segment 116 is rigidly and permanently coupled to the wheel connection segment 118 of the trailer frame 102. In such a configuration, the trailer 100 is provided with a fixed, permanent rear ramp.

In the exemplary embodiment, the rear ramp segment 116 includes left and right inclined beams 172a,b that extend substantially parallel to one another rearwardly and downwardly from the wheel connection segment 118 of the frame 102. Specifically, the left inclined beam 172a is coupled to and extends from an end of the left inner support beam 152a and the right inclined beam 172b is coupled to and extends from an end of the right inner support beam 152b. In certain embodiments, over 50, 60 or 75 percent of the left and right inclined beams 172a,b are unsupported (i.e., cantilevered). The unsupported (cantilevered) portion of the rear ramp segment 116 of the frame 102 can have a length in the range of 2 to 10 feet, 3 to 8 feet, or 4 to 6 feet, measured horizontally and parallel to the longitudinal axis 154 of the trailer 100.

A transverse end beam 174 is coupled to the distal ends of the left and right inclined beams 172a,b. Additionally, one or more transverse traction beams 176 can be coupled to the left and right inclined beams 172a,b at one or more locations spaced between the transverse end beam 174 and the wheel connection segment 118.

The transverse end beam 174 defines the rear end 106 of the trailer 100. The end beam 174 is spaced above the ground surface 146, but is low enough to permit the front and rear tractor tires to crawl up and over the end beam as the tractor 14 is loaded on the trailer 100. In certain embodiments, the left and right inclined beams 172*a,b* are laterally spaced from one another by a distance that is less than the inside spacing between the rearmost, innermost wheels 112*a,b* of the trailer. In fact, in the embodiment depicted in FIGS. 2-4 and 8, the upper end portions of the left and right inclined beams 172*a,b* are located between the rearmost, innermost wheels 12*a,b* of the trailer 100. In such a configuration, the transverse end beam 174 and the transverse traction beam 176 extend outwardly beyond the sides of the left and right inclined beams 172*a,b* in an unsupported (cantilevered) fashion. The top surfaces of the unsupported (cantilevered) portions of the end beam 174 and traction beam 176 can present a portion of the left and right rear inclined rear sections 132*a,b* of the left and right wheel travel paths 130*a,b*. Additionally, as described above and as depicted in FIGS. 2-4, 5*c*, and 8, the left and right rear trailer wheels 112*a,b* can be open (uncovered) so as to present outer surfaces that form a portion of the left and right rear inclined sections 132*a,b* of the left and right wheel travel paths 130*a,b*.

FIG. 9 is a side view of the agricultural equipment transporting system 10 in an unloaded configuration. The front end of the farm tractor 14 is shown in a position for loading onto the trailer 100. In particular, it is noted that the level of the transverse end beam 174 is on a plane parallel to the ground surface 146 and spaced below a center axis of a front axle assembly 180 of the tractor 14. Loading of the farm tractor 14 onto the trailer is carried out by driving the front wheels of the tractor sequentially (i) up the inclined rear section 132, (ii) over the over-wheel section 134, (iii) down the declined rear transition section 136, over the dropped landing section 138, (iv) up the inclined front transition section 140, and (v) onto the elevated landing section 142. As the front wheels of the tractor 14 traverse the wheel travel path 130 of the trailer 100, as described above, the rear wheels of the tractor 14 also pass (i) up the inclined rear section 132, (ii) over the over-wheel section 134, (iii) down the declined rear section 136, and (iv) onto the dropped landing section 138. When the front wheels of the tractor 14 are on the elevated landing section 142 and the rear wheels of the tractor 14 are on the dropped landing section, the tractor is in a loaded configuration, as shown in FIG. 1.

Further, as discussed previously with respect to FIGS. 5*a-c*, when the tractor 14 is in the loaded position, the front wheels of the tractor 14 and/or the rear wheels of the tractor 14 can be engaged with wheel stops that restrain forward and rearward movement of the tractor 14 relative to the trailer 100. As such, it is possible for the tractor 14 to be loaded on the trailer 100, without using additional securement devices to secure the tractor 14 to the trailer 100, even when the trailer 100 is used to haul the tractor 14 and attached implement 16 over the road.

As shown in FIGS. 1 and 9, the tractor 14 can be loaded on and unloaded off the trailer 100 while the implement is attached to the tractor via a hitch mechanism (e.g., a two-point hitch). The implement hitch mechanism permits the implement 16 to horizontally articulate (pivot) relative to the tractor 14 about a vertical axis at the hitch. After the tractor 14 is located on the trailer 100, the tow vehicle 12 can be used to transport the trailer 100, tractor 14, and implement 16 over the road. As shown in FIG. 1, while being transported over the road, the implement is support by the hitch connecting it to the tractor 14 and the rear implement wheels, which maintain contact with the road as the trailer 100, tractor 14, and implement 16 are towed over the road.

FIG. 10 shows that the trailer 100 can be used to haul the tractor 14 alone, without having an implement attached to the tractor 14 during loading, hauling, or unloading. The trailer 100 depicted in FIG. 10 has a similar configuration as the trailer of FIGS. 1-4 and 6-9; however, the trailer of FIG. 10 is slightly shorter. This shorter trailer 100 provides a wheel travel path similar to that shown in FIG. 5*c*, where the rear wheel of the loaded tractor 14 contacts and rests between the declined rear transition section 136 and the inclined front transition section 140. As such, the tractor 14 can be hauled over the road without needing to secure the tractor 14 to the trailer 100 via additional securement mechanisms (e.g., tiedowns).

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A trailer for enabling simultaneous over-the-road transportation of an agricultural tractor and an agricultural implement that is connected to said agricultural tractor, said trailer comprising:
   an elongated frame having a front end and a back end;
   a vehicle connection hitch coupled to said frame near said front end and configured to connect said trailer to an over-the-road towing vehicle;
   a plurality of trailer wheels coupled to said frame near said back end and configured to support said trailer on a ground surface; and
   a wheel travel path at least partially support by said frame and extending from said back end toward said front end, wherein said wheel travel path is configured to engage the tires of said tractor as said tractor is loaded on and unloaded off said trailer, wherein said wheel travel path includes—
   a) an inclined rear section located at or near said back end of said frame,
   b) an over-wheel section located generally in front of said inclined rear section and positioned generally over at least a portion of said trailer wheels,
   c) a dropped landing section located generally in front of said over-wheel section, and
   d) an elevated landing section located generally in front of said dropped landing section and configured to extend over a rear of said towing vehicle,
   wherein said over-wheel section is elevated relative to said dropped landing section and said elevated landing section is elevated relative to said over-wheel section,
   wherein said frame comprises a front support segment supporting at least a portion of said elevated landing section, wherein said front support segment presents an upper frame surface, wherein said elevated landing section is recessed relative to said upper frame surface.

2. The trailer of claim 1, wherein said frame includes a rigid frame portion that supports said elevated and dropped landing sections in a manner such that the positions and orientations of said elevated and dropped landing sections are permanently fixed relative to one another.

3. The trailer of claim 2, wherein the elevation of said over-wheel section is at least 0.25 foot higher than the elevation of said dropped landing section, wherein the elevation of said front landing section is at least 1 foot higher than the elevation of said over-wheel section, wherein the elevation of said dropped landing section is not more than 3 feet above the ground surface, wherein the elevation of said elevated landing section is not more than 5 feet above the ground surface.

4. The trailer of claim 1, wherein said frame includes a rigid frame portion that supports said over-wheel section and said inclined rear section in a manner such that the positions and orientations of over-wheel section and said inclined rear section are permanently fixed relative to one another.

5. The trailer of claim 4, wherein the position and orientation of said inclined rear section is permanently fixed relative to said dropped landing section, wherein the lowest elevation of said inclined rear section is in the range of 0.5 to 1.5 feet from the ground surface, wherein said rear inclined section is inclined at an angle in the range of 15 to 45 degrees relative to the ground surface.

6. The trailer of claim 1, wherein said frame includes a rigid frame portion that supports said elevated landing section, said dropped landing section, said over-wheel section, and said inclined rear section in a manner such that the positions and orientations of said elevated landing section, said dropped landing section, said over-wheel section, and said inclined rear section are permanently fixed relative to one another.

7. The trailer of claim 1, further comprising one or more wheel stops located on or adjacent said elevated and/or dropped landing sections, wherein said wheel stops are configured to engage the wheels of said tractor when said tractor is in a loaded position on said trailer to thereby restrict forward and/or rearward movement of said tractor relative to said trailer.

8. The trailer of claim 1, wherein said front support segment comprises two inner beams, two outer beams, and a plurality of spaced apart crosswise support members, wherein each crosswise support member is coupled to and extends between one of said inner beams and one of said outer beams at a location below said upper frame surface, wherein at least a portion of said crosswise support members present said elevated landing section.

9. The trailer of claim 1, wherein said wheel travel path includes spaced apart left and right wheel travel paths, wherein said trailer comprises one or more open recessed areas located between and below the elevation of an adjacent portion of said left and right wheel travel paths.

10. The trailer of claim 9, wherein said wheel travel path includes a declined rear transition section and an inclined front transition section, wherein said rear transition section is located between said over-wheel section and said dropped landing section, wherein said front transition section is located between said dropped landing section and said elevated landing section, wherein at least one of said open recessed areas is located at said inclined front transition section and/or at said rear inclined section.

11. The trailer of claim 10, wherein said open recessed areas are located at said rear inclined section, said over-wheel section, said declined rear transition section, said dropped landing section, said inclined front transition section, and said elevated landing section.

12. The trailer of claim 1, wherein said trailer has a capacity of at least 10,000 pounds and an overall length of 15 to 30 feet.

13. A trailer for enabling simultaneous over-the-road transportation of an agricultural tractor and an agricultural implement that is connected to said agricultural tractor, said trailer comprising:
an elongated frame having a front end and a back end;
a vehicle connection hitch coupled to said frame near said front end and configured to connect said trailer to an over-the-road towing vehicle;
a plurality of trailer wheels coupled to said frame near said back end and configured to support said trailer on a ground surface; and
a wheel travel path at least partially support by said frame and extending from said back end toward said front end, wherein said wheel travel path is configured to engage the tires of said tractor as said tractor is loaded on and unloaded off said trailer, wherein said wheel travel path includes—
a) an inclined rear section located at or near said back end of said frame,
b) an over-wheel section located generally in front of said inclined rear section and positioned generally over at least a portion of said trailer wheels,
c) a dropped landing section located generally in front of said over-wheel section, and
d) an elevated landing section located generally in front of said dropped landing section and configured to extend over a rear of said towing vehicle,
wherein said over-wheel section is elevated relative to said dropped landing section and said elevated landing section is elevated relative to said over-wheel section,
wherein at least portion of said rear inclined section is provided by an exposed surface of said trailer wheels in a manner such that said tires of said tractor contact and are at least partially supported by said trailer wheels as said tractor travels up said inclined rear section.

14. The trailer of claim 13, wherein said frame includes a rear ramp segment supporting at least a portion of said inclined rear section, wherein said rear ramp segment includes a first longitudinal beam, a second longitudinal beam, a transverse end beam, and at least one transverse traction beam, wherein said first and second longitudinal beams are spaced from one another, extend substantially parallel to one another, and are at least partially cantilevered, wherein said transverse end beam is coupled to cantilevered distal ends of said first and second longitudinal beams, wherein said transverse end beam defines said rear end of said frame, wherein said end beam is configured to contact the tires of said tractor and support the weight of said tractor as said tractor is loaded on and unloaded off said trailer, wherein said transverse traction beam is spaced from and extends substantially parallel to said end beam, wherein said transverse traction beam is coupled to and extends in a cantilevered manner from one or both of said first and second longitudinal beams, wherein a cantilevered portion of said traction beam is configured to contact the tires of said tractor and support the weight of said tractor as said tractor is loaded on and off said trailer.

15. A method of transporting an agricultural vehicle, said method comprising:
(a) providing an over-the-road towing vehicle with a trailer coupled behind said towing vehicle;

(b) providing an agricultural tractor with an agricultural implement coupled behind said tractor;
(c) loading said agricultural tractor onto said trailer, wherein said loading includes driving said tractor onto said trailer while—
  i) said implement is coupled to said tractor; and
  ii) said trailer is coupled to said towing vehicle;
(d) towing said trailer, said tractor, and said implement over a road with said towing vehicle while—
  i) said tractor is loaded on said trailer,
  ii) said implement is attached to said tractor, and
  iii) said implement is pulled behind said tractor on said road.

16. The method of claim 15, wherein said loading of step (c) includes driving said tractor onto said trailer via an inclined rear ramp located at the rear of said trailer, wherein said inclined ramp is a fixed ramp that is positioned and oriented the same during said loading of step (c) and said towing of step (d).

17. The method of claim 15 wherein said loading of step (c) includes driving the front wheels of said tractor sequentially—
  i) up an inclined ramp at the rear of trailer,
  ii) over rear wheels of said trailer,
  iii) down a rear transition section,
  iv) over a dropped landing section,
  v) up a front transition section, and
  vi) onto an elevated landing section,
  wherein the rear wheels of said tractor are positioned on said dropped landing section when the front wheels of said tractor are positioned on said elevated landing section.

18. The method of claim 15, wherein said loading of step (c) includes stopping said tractor in a loaded position where at least one of said front or rear wheels is positioned against one or more wheel stops that inhibiting movement of said tractor relative to said trailer.

19. The method of claim 18, wherein said wheel stops include a forward wheel stop engaging a front side of at least one of said front or rear wheels and at least one rearward wheel stop engaging a rear side of at least one of said front or rear wheels to thereby inhibit rearward movement of said tractor relative to said trailer.

20. The method of claim 19, wherein said forward and rearward wheel stops cooperatively form at least one wheel saddle for receiving a front or rear wheel of said tractor, wherein said wheel saddle allows said towing of step (d) to be carried out without having to secure said tractor to said trailer with additional securement devices.

21. The method of claim 15, further comprising, subsequent to said towing of step (d), unloading said tractor from said trailer by driving said tractor off said trailer while said implement is coupled to said tractor and while said trailer is coupled to said towing vehicle.

22. The method of claim 15, wherein said trailer comprises:
  an elongated frame having a front end and a back end;
    a vehicle connection hitch coupled to said frame near said front end and connecting said trailer to said towing vehicle;
    a plurality of trailer wheels coupled to said frame near said back end and supporting said trailer on the road; and
    a wheel travel path at least partially supported by said frame and extending from said back end toward said front end, wherein said wheel travel path is configured to engage the tires of said tractor as said tractor is loaded on and unloaded off said trailer, wherein said wheel travel path includes—
      a) an inclined rear section located at or near said back end of said frame,
      b) an over-wheel section located generally in front of said inclined rear section and positioned generally over at least a portion of said trailer wheels,
      c) a dropped landing section located generally in front of said over-wheel section, and
      d) an elevated landing section located generally in front of said dropped landing section,
    wherein said over-wheel section is elevated relative to said dropped landing section and said elevated landing section is elevated relative to said over-wheel section,
    wherein said tractor comprises front wheels that are supported on said elevated landing section and rear wheels supported on said dropped landing section when said tractor, trailer, and implement are towed on said road.

* * * * *